Jan. 18, 1949.  W. D. TEAGUE, JR., ET AL  2,459,200
CONTROL APPARATUS FOR CARRIAGE DRIVE FOR
RECIPROCATING CARRIAGE SLICING MACHINES
Filed Oct. 6, 1943  4 Sheets—Sheet 1
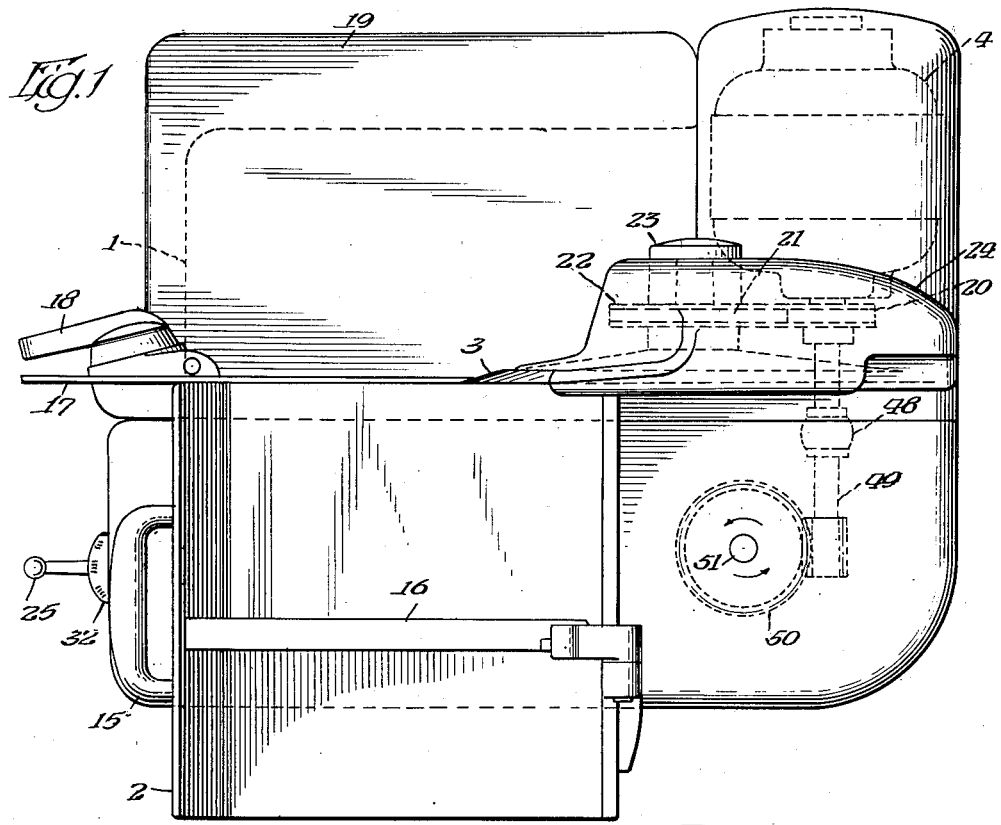
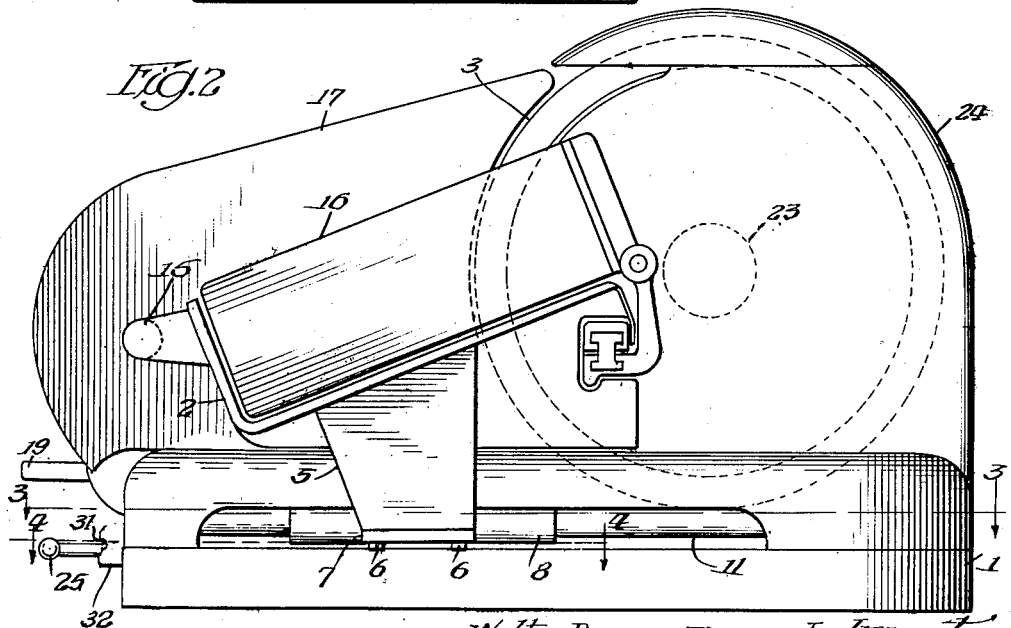

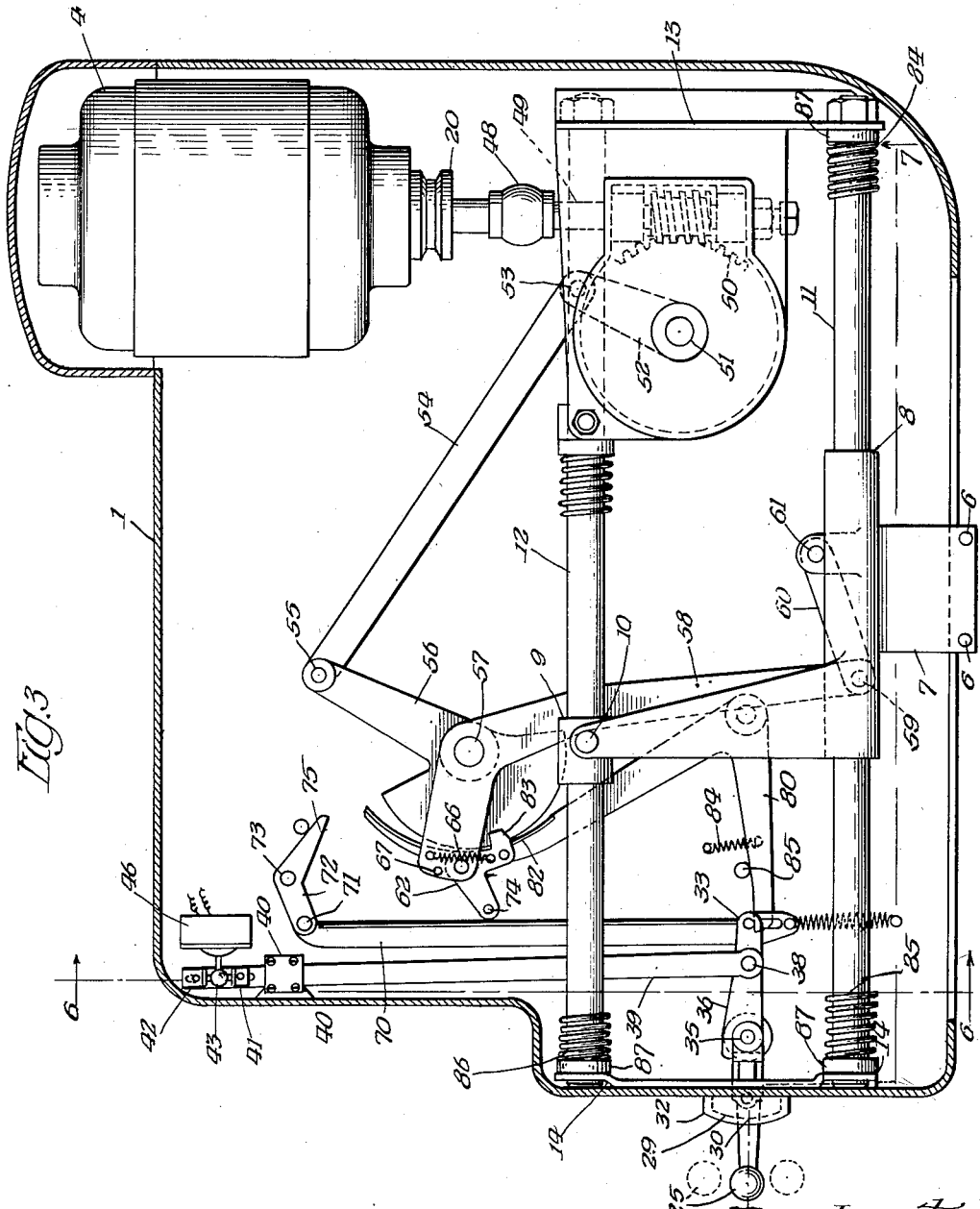

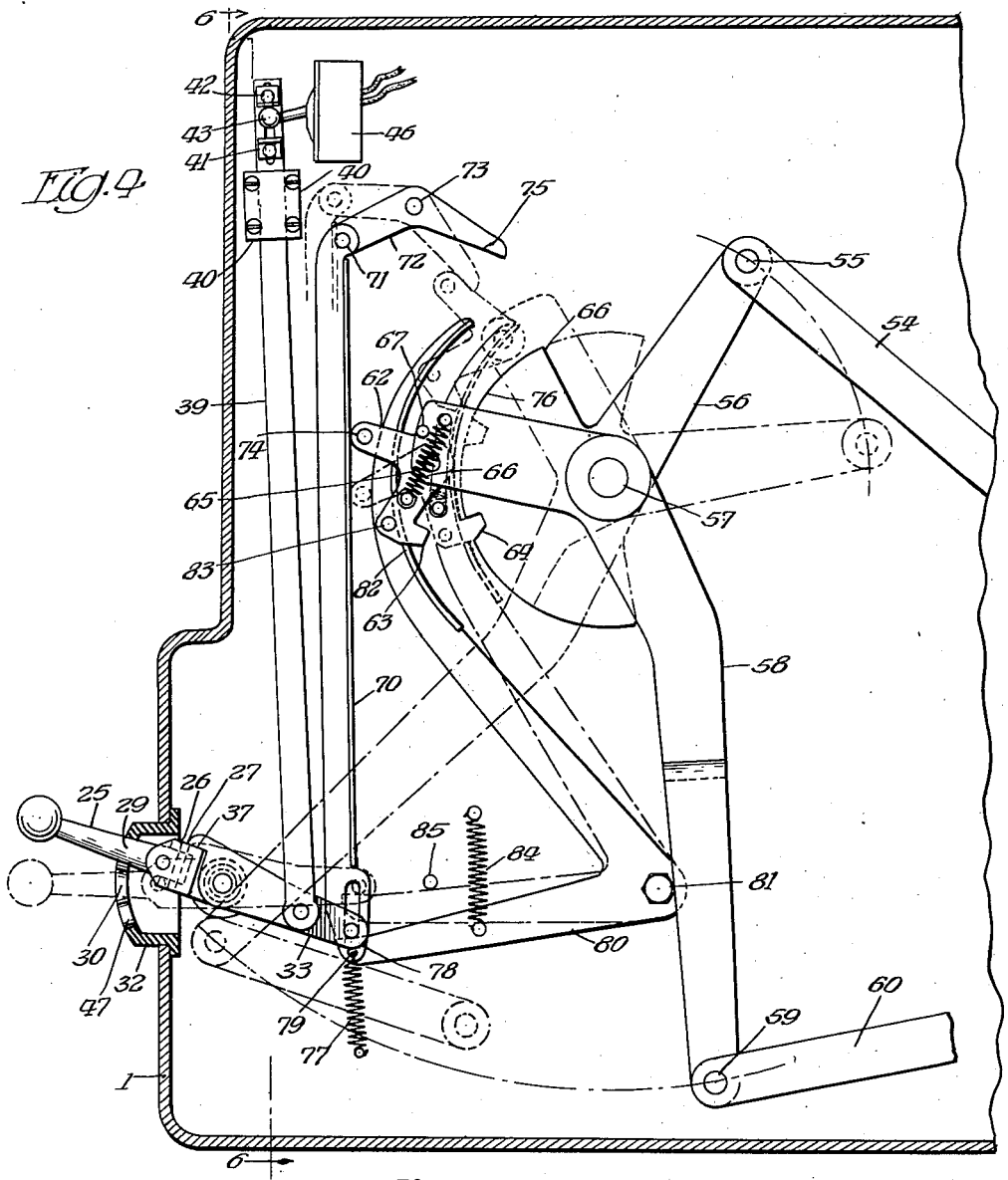
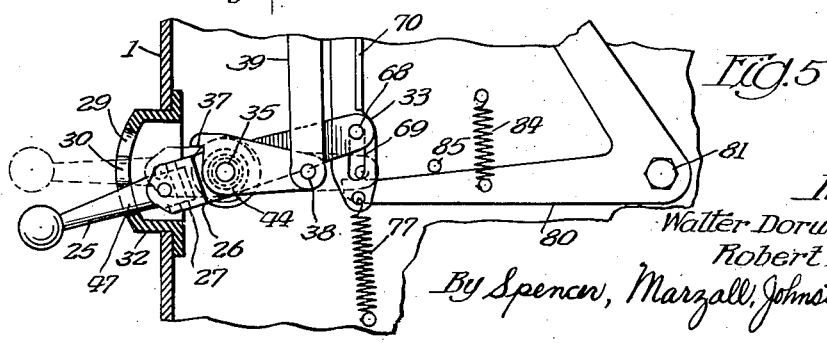

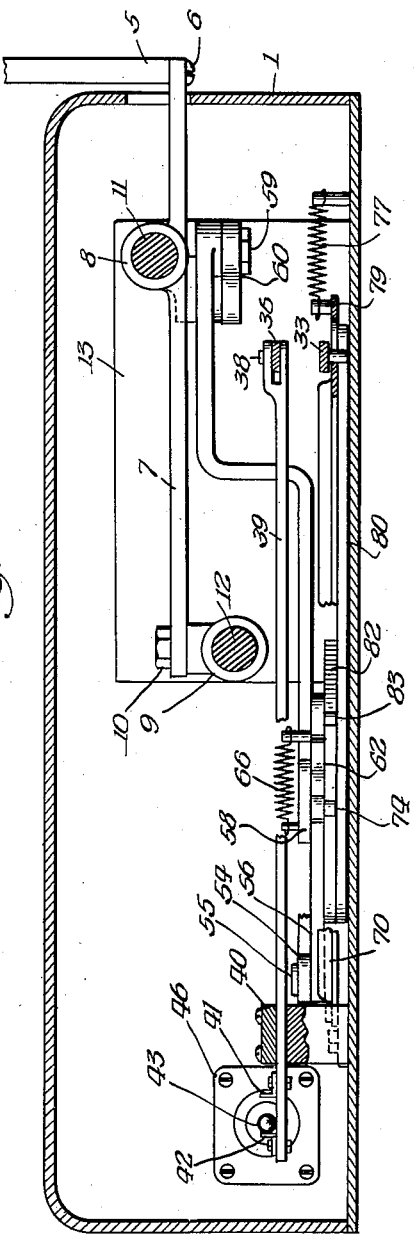

Patented Jan. 18, 1949

2,459,200

UNITED STATES PATENT OFFICE 2,459,200

CONTROL APPARATUS FOR CARRIAGE DRIVE FOR RECIPROCATING CARRIAGE SLICING MACHINES

Walter Dorwin Teague, Jr., Alpine, N. J., and Robert H. Ensign, New York, N. Y., assignor to U. S. Slicing Machine Company, La Porte, Ind., a corporation of Indiana Application October 6, 1943, Serial No. 505,092

14 Claims. (Cl. 146—102)

This invention relates to slicing machines in general, and particularly to slicing machines of the so-called "push-pull" type having a substance table adapted to be manually reciprocated in a rectilinear direction past the cutting edge of a continuously rotating circular slicing knife. It relates specifically to slicing machines of the "push-pull" type in which the substance table may be operated either mechanically or manually.

An important object of the present invention is the provision of a new and improved slicing machine transmission for permitting engagement or disengagement of the driving connection from the slicing knife drive mechanism to the substance table.

Another important object of the invention is the provision of means to start the substance table only from a predetermined position when the slicing machine transmission is shifted to fully mechanical operation.

Another object of the invention is to provide means to prevent initial movement of the substance table toward the operator when the slicing machine transmission is shifted to full mechanical operation.

An additional object of the invention is to provide mechanism to avoid a fractional initial slice of the substance being cut when the slicing machine transmission is shifted from its neutral or manually operated position to its fully mechanically operated position.

Still another object of the invention is the provision of means to engage the driving and driven elements of said transmission when their relative speed approaches zero so as to minimize mechanical shock of engagement when the slicing machine transmission is shifted to fully mechanical operation.

A further object of the invention is to provide means whereby the slicing machine transmission can not be operated unless the shifter control lever be held in place manually until the actual engagement of the transmission takes place.

Another object of the invention is the provision of means to eliminate the possibility of hand operation with the device set for mechanical drive with the driving connection from the slicing knife drive mechanism to the substance table disengaged so long as the substance table is not brought to a predetermined position whereby to eliminate unexpected engagement with its dangerous possibilities.

A still further object of the invention is to provide means whereby both of the operator's hands must be used to shift the slicing machine transmission to fully mechanical operation so as to minimize to a great extent the possibility of accidentally starting the substance table drive by inadvertently contacting any single control lever or switch.

Another object of the invention is the provision of means whereby the difference between the movement of the controls for substance table engagement and the movement for manual operation is so obvious to the operator that it tends to eliminate unintentional starting of the substance table travel, instead of knife rotation only, while holding the substance to be sliced.

An additional object of the invention is to provide means which will prevent dangerous unintentional table travel, when the machine is next started, by the provision of means to disengage the substance table drive every time the machine is turned off.

Another object of the invention is to provide means to disengage the table drive quickly at any point in the substance table's travel and to eliminate a disengagement which will operate at only one point in the stroke cycle and could take nearly one complete cycle to complete, a dangerously long time in an emergency.

Numerous other objects and advantages will be apparent throughout the progress of the following specification.

The accompanying drawings illustrate a selected embodiment of the invention, and the views therein are as follows:

Fig. 1 is a top plan view of a slicing machine embodying the invention;

Fig. 2 is a right end elevational view of the machine shown in Fig. 1;

Fig. 3 is a detail plan sectional view on the line 3—3 of Fig. 2, and shows, among other things, details of the table drive mechanism;

Fig. 4 is a detail sectional view on the line 4—4 of Fig. 2, showing, among other things, features of the table drive mechanism in greater detail than that shown in Fig. 3;

Fig. 5 is a fragmentary sectional view, also on the line 4—4 of Fig. 2, illustrating, among other things, details of the operating control handle;

Fig. 6 is a detail vertical sectional view on the line 6—6 of Fig. 3, illustrating, among other things, details of the table drive mechanism; and Fig. 7 is a detail vertical sectional view on the line 7—7 of Fig. 3, illustrating, among other things, further details of the table drive mechanism.

In the particular slicing machine herein shown for the purpose of illustrating the invention, a substance supporting tray 2 is mounted for reciprocation upon a stationary base or support 1 (Fig. 1). A circular knife 3, adapted to slice the substance supported upon the tray 2, is mounted toward the rear of the base 1 and is rotated by an electric motor 4.

The substance tray 2 is supported upon a bracket 5 mounted with screws 6 upon a saddle 7 (Fig. 3). The saddle 7 is preferably cast integral with a bearing 8 and extends laterally beneath the substance tray 2 where it is secured to a bearing 9 by a bolt 10. Bearings 8 and 9 slide freely upon cylindrical ways 11 and 12 so as to permit reciprocation of the substance table 2. Brackets 13 and 14 mounted upon the base 1 securely support the ends of cylindrical ways 11 and 12. A handle 15 (Figs. 1 and 2) is provided to reciprocate manually the substance table 2.

The substance to be cut may be fed perpendicularly to the slicing plane of the knife 3 in any way desired, either manually or by a spring urged pusher plate 16, in any manner well known in the art. A gauge plate 17 whose active face lies in a plane parallel to the slicing plane of the knife, controls the thickness of each slice of substance to be cut and is adapted to be manually adjusted to vary the thickness of a slice by any conventional mechanism controlled by an adjustment knob 18. The space between the slicing plane of the knife 3 and the plane of the gauge plate 17 determines the thickness of the slice to be cut. A tray 19 is provided to catch the slices of substance as they fall from the knife 3.

The knife 3 is rotated by the motor 4 through a pulley 20 which drives a belt 21 which rotates a pulley 22 mounted upon the spindle 23 of the slicing knife 3. This spindle 23 is supported to the base 1 of the slicing machine by an upright knife supporting bracket 24.

A shifter master control lever 25 on the front of the base 1, which controls the operation of the machine, is mounted in a bracket 26 (Fig. 7) with a pin 27. A spring 28 presses the control handle 25 downwardly to permit its engagement with detents located at positions 29 and 30 (Figs. 4 and 5) in the lower edge of slot 31 (Fig. 7) of guide plate 32 mounted in the front face of base 1. Bracket 26 is mounted at one end of, and is preferably made integral with, an L-shaped arm 33 (Figs. 5 and 7) which is fastened to a collar 34 which in turn is pivoted upon a stud 35. Also mounted upon stud 35 is a crank 36, one end of which is provided with a tooth 37 (Fig. 5) and the other end of which is fastened, by means of a pin 38, to a link 39 journaled for reciprocation in a bearing carried within a bearing support 40. The end of link 39, at the opposite extremity from that which carries the pin 38, is provided with two adjustable brackets 41 and 42 which are adapted to engage the operating knob 43 of a snap switch 46. One end of a spring 44 (Fig. 7), which is coiled within the collar 34, is securely fastened to the collar 34, and the other end is securely fastened to the crank 36. Spring 44 is maintained under sufficient tension to tend to maintain contact between tooth 37 upon crank 36 and the vertical portion 45 of L-shaped arm 33. The adjustable brackets 41 and 42 are positioned on the link 39 so that when the shifter control lever 25 (Fig. 4) is moved to the left to the detent at position indicated by numeral 29, the operating knob 43 of the switch 46 will be moved to its right hand or off position. The crank 36 is of such length that movement of the shifter control lever 25 to the central position, determined by detent at position indicated by numeral 30, will move the operating knob 43 of the switch 46 to its on or extreme left position, viewing the machine from the front. Movement of the shifter control lever 25 one more step to the right, viewing the slicing machine from the front, to the position indicated by numeral 47, does not cause a continued movement of the crank 36 with the arm 33 because the prior movement of the shifter control lever 25 to the central position, indicated by numeral 30, has moved the operating knob 43 of the switch 46 to its extreme left hand position and this will prevent continued engagement of the tooth 37 with the vertical portion 45 of the L-shaped arm 33, as the movement of the tooth 37 will be arrested, and the bracket 27 will continue in its movement and away from the tooth 37. The mechanism just described starts the electric motor through the closing of the switch 46 when the shifter control lever 25 is moved to its central position determined by the detent located at numeral 30; permits the continued operation of the electric motor 4, when the shifter control lever 25 is shifted to the position indicated by the numeral 47; and stops the motor 4 by opening of the switch 46 when the shifter control lever 25 is moved to the detent at position indicated by the numeral 29.

The particular slicing machine herein described is also provided with mechanism for mechanically reciprocating the substance tray 2. The drive from the motor 4 extends past the pulley 20 (Fig. 3) through a coupling 48 to a shaft 49 of a worm and worm wheel drive mechanism 50 which rotates, at a reduced speed, a shaft 51 upon which a crank arm 52 continually revolves. The circumferential extremity of the crank arm 52 is fastened with a pin 53 to a connecting link 54 which is connected with a pin 55 to a driving rocking arm 56 pivoted upon a stud 57. Since the crank arm 52 has a smaller radius than the rocking arm 56, constant rotation of the crank arm 52 results in a constant oscillation of the rocking arm 56.

Also pivoted upon the stud 57 is a driven crank 58, its right hand end (Fig. 6) being displaced upwardly from stud 57 and being fastened with a pin 59 to a link 60, which latter is connected with a pin 61 (Fig. 3) to the bearing 8 which latter supports the substance tray 2.

Mechanism hereafter to be described connects the rocking arm 56 and the crank 58 together so that the oscillation of the rocking arm 56 actuates the crank 58 to transmit longitudinal reciprocation to the substance tray 2 through the link 60 and the bearing 8. Said mechanism is controlled by the shifter control lever 25 so that movement of the control lever to the position indicated by the numeral 47 (Fig. 5) properly connects the rocking arm 56 and the crank 58 to transmit reciprocation from the rocking arm 56 to the crank 58; and so that movement of the shifter control lever 25 to its stop position, determined by a detent located at the numeral 29 (Fig. 4), disengages the rocking arm 56 from the crank 58. Later movement of the shifter control lever 25 to the detent position indicated by the numeral 30 to restart the machine permits free oscillation of the rocking arm 56 without effecting any substance tray movement.

A dog 62 connects the rocking arm 56 with the crank 58. Tooth 63 of the dog 62 is free to fit into a notch 64 in the rocking arm 56. The dog 62 is pivotally mounted by means of a pin 65 upon the crank 58 and is free to occupy either the solid line position indicated in Fig. 4, wherein the tooth 63 and the notch 64 are out of engagement with each other, or to occupy the dotted line position, wherein the tooth 63 and the notch 64 are in engagement with each other, being maintained in either position by an overcentering spring 66. A pin 67 limits the movement of the dog 62 in its out of engagement position.

Movement of the shifter control lever 25 to its extreme right hand position, indicated by numeral 47 in Fig. 4, moves a bell crank 72 in a clockwise direction to the dotted line position shown in Fig. 4, by moving a pin 68 (Fig. 5) into its extreme left hand position against the left end of a slot 69 at the right extremity of a link 70 and which link is also connected at its opposite extremity, by means of a pin 71, to bell crank 72 that is pivotally mounted on a stud 73. Now, to engage the mechanical table drive, the operator manually holds the shifter control lever 25 in this position and, in addition, he manually pulls the substance tray 2 toward himself with the operating handle 15, which movement actuates the crank 58, carrying with it the dog 62, in a clockwise direction to the dotted line position indicated in Fig. 4. When the substance tray 2 has been thus moved nearly to its extreme position toward the operator, a pin 74 on the dog 62 contacts the surface 75 of the bell crank 72. Continued movement of the substance tray 2 toward the operator causes the bell crank 75 to trip the dog 62 so that the tooth 63 will come in contact with the circumference 76 of the rocking arm 56. When the rocking arm 56, which is driven by the motor, has reached, or nearly reached, the extreme clockwise position in its reciprocation, indicated by the dotted line position in Fig. 4, the continued movement of the arm 56 will bring the notch 64 into registration with the tooth 62 and to allow it to latch in the notch and establish a driving connection between the motor 4 and the substance tray 2. Such driving connection comprises the shaft 49, worm and worm wheel drive mechanism 50, shaft 51, crank arm 52, connecting link 54, rocking arm 56, dog 62, crank 58, link 60, and bearing 8, and serves to mechanically reciprocate the substance tray 2. After the engagement has been completed the operator releases his hold on the shifter control lever 25, and a spring 77, fastened to the right extremity of the arm 70 by a pin 79, will cause a return of the link 70, and with it a return of the shifter control lever 25, to the normal running position established by the detent whose position is indicated by the numeral 30 in Fig. 4.

Movement of the shifter control lever 25 to the left, or stop position established by the detent at the position indicated by the numeral 29, in addition to opening the switch 46, also moves the L-shaped arm 33 to the extreme right hand position indicated by solid lines in Fig. 4. In so doing, pin 68 on the L-shaped arm 33 pushes against one edge of a crank 80 pivoted at 81, and moves the crank 80 into its extreme counterclockwise position to bring a raised skid 82 into engagement with a pin 83 mounted upon the dog 62 which disengages the tooth 63 from the notch 64, thereby breaking connection between the rocking arm 56 and the crank 58 to permit manual reciprocation of the substance tray 2 upon subsequent starting of the slicing machine. Upon subsequent movement of the shifter control lever 25 to its central or start position established by the detent whose location is indicated by the numeral 30, a spring 84 moves the crank 80 in a clockwise direction against a pin 85 so that the raised skid 82 will not engage the pin 83 to prevent engagement of the tooth 63 with the notch 64 upon a later movement of the shifter control lever 25 into its extreme right hand position, indicated by the numeral 47 in Fig. 4.

It will be noted that link 39 and crank 80 have a similar pattern of motion. When the shifter control lever 25 is shifted to the extreme left hand position established by the detent located at numeral 29, then link 39 and crank 80 each experience a movement. When shifter control lever 25 is shifted to the center position established by the detent located at numeral 30, link 39 and crank 80 each experience a movement. However, when shifter control lever 25 is shifted to the extreme right hand position indicated by numeral 47, neither link 39 nor crank 80 will experience any additional movement. Accordingly, it may sometimes be advisable in applying the principles of operations herein described to a slicing machine to eliminate crank 36, spring 44, link 39 and bearing 40. The switch 46 could then be moved to some convenient location near the crank 80 and could be connected by a short linkage directly to said crank 80 so that when shifter control lever 25 is shifted to the left, the switch 46 would be turned to its off position, and so that movement of the shifter control lever 25 to its central position will turn the switch 46 on. One advantage of this re-arrangement would be a slight simplification of the mechanical linkages, but the mode of operation would be unchanged.

Bumper springs 84' and 85' are provided at each end of the cylindrical way 11 for engagement with opposite ends of the bearing 8 so that the reversals in reciprocation of the substance tray 2 will be cushioned. Spring 85' is made of such length that a slight compresison is necessary to move crank 58 sufficiently clockwise to permit engagement of the tooth 63 on dog 62 with the notch 64 of the rocking arm 56. This will prevent accidental engagement of the crank 58 with the rocking arm 56 since it requires an intentional act by the operator to pull the substance tray 2 to its extreme forward limit of travel. In the alternative, the spring 85' may be made short enough to permit free engagement of the crank 58 with the rocking arm 56, and a spring 86, with softer action than spring 85', may be provided on the cylindrical way 12. The spring 86 should be selected of such length that it must be compressed by the bearing 9 in order to permit engagement of the crank 58 with the rocking arm 56. The alternative manner has the advantage of requiring less pull on the part of the operator when engaging the mechanical drive and is particularly appealing to woman operators. Rubber washer shaped bumpers 87 may be provided between the springs 84', 85' and 86 and their respective end brackets 13 and 14 to help quiet the operation of the slicing machine.

The control mechanism for the slicing machine above described provides a simple and positive means for regulating the operation of any slicing machine, in that one three-position shifter control lever regulates the stopping and starting of the machine and determines whether the slicing machine shall be fully mechanically operated or whether the table shall be manually reciprocated and only the slicing knife mechanically operated. Machines embodying this feature are generally known to the trade as "semi-all" machines, and heretofore have required rather complex controls and lack certain safety features presented by this operating mechanism.

One of the particular safety features of importance is that a change from manual to fully mechanical operation is impossible unless the slicing table is manually moved to its forward limit of travel. This eliminates the possibility of the table moving forward under mechanical power and striking or catching the operator. It further enables the operator to know in which direction the table will start and eliminates the possibility of any erroneous assumption on his part as to which direction the table will initially move, which erroneous assumption frequently results in serious cuts or injuries to the operator.

Another safety feature is the provision of disconnecting the mechanical table drive each time the machine is stopped. This safety feature prevents the table from being operated mechanically unless the operator moves the handle to its extreme right hand position and simultaneously pulls the substance table toward him, and likewise prevents any injuries from an unanticipated mechanical operation of the table catching the operator off guard.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A slicing machine comprising the combination, with a motor, a knife, a driving connection between said motor and said knife, and a reciprocating carriage, of a driving connection between said motor and said reciprocating carriage including a driving member, a driven member and a clutch adapted to engage said driven member with said driving member, a single three-position control mechanism for said motor and for said clutch having means to start said motor when said three-position control mechanism is shifted to a first position, means to engage said clutch when said three-position control mechanism is shifted to and held in a second position and means to stop said motor and to disengage said clutch when said three-position control mechanism is shifted to a third position, said three-position control mechanism being so arranged that it is necessary to shift to the first position prior to an operative shift to the second position, and a second control mechanism adapted to co-operate with and to make operable said means to engage said clutch, said second control mechanism being so arranged that it will co-operate with and make said latter means operable only when said reciprocating carriage approaches the forward limit of its travel.

2. A slicing machine comprising, with a motor, a knife, a driving connection between said motor and said knife, and a reciprocating carriage, of a driving connection between said motor and said reciprocating carriage including a driving member, a driven member and a clutch adapted to engage said driven member with said driving member, a single three-position control mechanism for said motor and for said clutch having means to start said motor when said three-position control mechanism is shifted to a first position, means to engage said clutch when said three-position control mechanism is shifted to and held in a second position and means to stop said motor and to disengage said clutch when said three-position control mechanism is shifted to a third position, said three-position control mechanism being so arranged that it is necessary to shift to the first position prior to an operative shift to the second position, and a second control mechanism adapted to co-operate with and to make operable said means to engage said clutch, said second control mechanism being so arranged that it will co-operate with and make said latter means operable only when said reciprocating carriage is manually urged toward its forward limit of travel.

3. A slicing machine comprising the combination, with a motor, a knife drivingly connected with said motor, and a reciprocating carriage for a substance to be sliced, of motor control means, means for connecting the carriage for reciprocation by the motor and for disconnecting the carriage for manual reciprocation comprising a driven member connected with the carriage, a driving member connected with said motor, clutch means adapted to engage said driven and driving members, said clutch means being positionable selectively in engaging and in released position, means yieldingly holding the clutch means in each of said positions, manual control mechanism embodying means common to said clutch means and motor control means for disabling said motor from operation and for throwing the clutch means to released position, said manual means being operable to another position to render the motor active when the clutch means is in a released position, and means operable by said manual means engageable with the clutch means to actuate the same into its operating position, and means for moving the manual control mechanism to normal running position when the said clutch means has been rendered active.

4. A slicing machine comprising the combination, with a motor, a knife drivingly connected with said motor, and a reciprocating carriage for a substance to be sliced, of means for connecting the carriage for reciprocation by the motor and for disconnecting the carriage for manual reciprocation comprising a driven member connected with the carriage, a driving member connected with said motor, clutch means on said driven member and selectively operable thereon in position to drivingly engage with and to drivingly release said driving member, and control mechanism manually operable to start and stop said motor, clutch disengaging means adapted to be set by the operation of said control mechanism for rendering the clutch inactive, and means also rendered operable by said control mechanism, to render the clutch active only after said motor has been placed in operation by said control mechanism, and only when said carriage has reached a predetermined point short of the limit of its travel.

5. A slicing machine comprising the combination, with a motor, a knife drivingly connected with said motor, and a carriage for a substance to be sliced movable toward and away from said knife, of means for connecting the carriage for reciprocating movement by the motor and for disconnecting the carriage for manual reciprocation comprising a driven member connected with the carriage, a driving member connected with said motor, clutch means adapted to engage said driven and driving members, said clutch means comprising a clutch member positionable selectively in clutch engaging position and in clutch disengaged position, said member being connected with said carriage and being bodily movable, in said engaging and in said disengaged positions, in response to carriage movement with respect to said knife, manually operable control mechanism including a clutch operating member positionable to actuate said clutch member, in the course of its bodily movement, to throw the same from disengaged to clutch engaging position only when said carriage is at a predetermined position with respect to the knife.

6. A slicing machine comprising the combination, with a motor, a knife drivingly connected with said motor, and a carriage for a substance to be sliced movable toward and away from said knife, of means for connecting the carriage for reciprocating movement by the motor and for disconnecting the carriage for manual reciprocation comprising a driven member connected with the carriage, a driving member connected with said motor, clutch means adapted to engage said driven and driving members, said clutch means comprising a clutch member positionable selectively in clutch engaging position and in clutch disengaged position, said member being connected with said carriage and being bodily movable, in said engaging and in said disengaged positions, in response to carriage movement with respect to said knife, manually operable control mechanism including a clutch operating member positionable to actuate said clutch member, in the course of its bodily movement, to throw the same from disengaged to clutch engaging position only when said carriage is at the limit of its reciprocating movement away from the knife.

7. A slicing machine comprising the combination, with a motor, a knife drivingly connected with said motor, and a carriage for a substance to be sliced movable toward and away from said knife, of means for connecting the carriage for reciprocating movement by the motor and for disconnecting the carriage for manual reciprocation comprising a driven member connected with the carriage, a driving member connected with said motor, clutch means adapted to engage said driven and driving members, said clutch means comprising a clutch member positionable selectively in clutch engaging position and in clutch disengaged position, said member being connected with said carriage and being bodily movable, in said engaging and in said disengaged positions, in response to carriage movement with respect to said knife, manually operable control mechanism including a clutch operating member positionable to actuate said clutch member, in the course of its bodily movement, to throw the same from disengaged to clutch engaging position only when said carriage is at a predetermined position with respect to the knife, and means operable simultaneously to stop said motor and to shift said clutch member to disengaged position.

8. A slicing machine embodying a reciprocable carriage, motor driven means for reciprocating said carriage, and embodying two oscillatable members, one of said oscillatable members being provided with a recess, a dog pivotally connected to the other of said members and adapted to be seated in said recess for interlocking said members, and also removable from the recess to render said members free to oscillate with respect to each other, means for controlling said motor, means for controlling the operation of said dog for locking and unlocking said members, and a master control means for controlling the motor control means and the dog control means.

9. A slicing machine embodying a reciprocable carriage, motor driven means for reciprocating said carriage, and embodying two oscillatable members, one of said oscillatable members being provided with a recess, a dog pivotally connected to the other of said members and adapted to be seated in said recess for interlocking said members, and also removable from the recess to render said members free to oscillate with respect to each other, means for controlling said motor, means for controlling the operation of said dog for locking and unlocking said members, a master control means for controlling the motor control means and the dog control means, said dog being itself actuated by an overthrow spring, and additional means for shifting said dog with respect to its support.

10. A slicing machine embodying a reciprocable carriage, motor driven means for reciprocating said carriage, and embodying two oscillatable members, one of said oscillatable members being provided with a recess, a dog pivotally connected to the other of said members and adapted to be seated in said recess for interlocking said members, and also removable from the recess to render said members free to oscillate with respect to each other, means for controlling said motor, means for controlling the operation of said dog for locking and unlocking said members, a master control means for controlling the motor control means and the dog control means, said dog being itself actuated by an overthrow spring, and additional means for shifting said dog with respect to its support, the said additional means being normally in an inactive position with respect to said dog, and being responsive, in its movement into an active position to shift said dog, to the operation of the said master control means.

11. A slicing machine embodying a motor, a knife, an operative connection between the motor and knife, a reciprocable carriage, a driving connection between said carriage and motor, including a driving member, a driven member and interlocking means between said members, control means for said motor and said interlocking means, said control means being movable to one position to start the motor, means responsive to the movement of the control means, and its maintenance in another position, only subsequent to the movement of the control means to the first said position, to render the interlocking means active, and means also responsive to the movement of the control means to still another position to render the said interlocking means inactive, the means responsive to the movement of the said control means to the second recited position to render the interlocking means active, being effective only when the said carriage reaches a predetermined position in its travel.

12. A slicing machine embodying a motor, a knife, an operative connection between the motor and knife, a reciprocable carriage, a driving connection between said carriage and motor, including a driving member, a driven member and interlocking means between said members, control means for said motor and said interlocking means, said control means being movable to one position to start the motor, means responsive to the movement of the control means, and its maintenance in another position, only subsequent to the movement of the control means to the first said position, to render the interlocking means active, means also responsive to the movement of the control means to still another position to render the said interlocking means inactive, the means responsive to the movement of the said control means to the second recited position to render the interlocking means active, being effective only when the said carriage reaches a predetermined position in its travel, the said interlocking means embodying a locking element shiftably connected with one of said members, and adapted to co-operate with a portion on the other member, and means for yieldingly holding said locking element in active and inactive positions.

13. A slicing machine embodying a motor, a knife, an operative connection between the motor and knife, a reciprocable carriage, a driving connection between said carriage and motor, including a driving member, a driven member and interlocking means between said members, control means for said motor and said interlocking means, said control means being movable to one position to start the motor, means responsive to the movement of the control means, and its maintenance in another position, only subsequent to the movement of the control means to the first said position, to render the interlocking means active, means also responsive to the movement of the control means to still another position to render the said interlocking means inactive, the means responsive to the movement of the said control means to the second recited position to render the interlocking means active, being effective only when the said carriage reaches a predetermined position in its travel, the said interlocking means embodying a locking element shiftably carried by one of said members, and adapted to co-operate with a part on the other member.

14. A slicing machine embodying a motor, a knife, an operative connection between the motor and knife, a reciprocable carriage, a driving connection between said carriage and motor, including a driving member, a driven member and interlocking means between said members, control means for said motor and said interlocking means, said control means being movable to one position to start the motor, means responsive to the movement of the control means, and its maintenance in another position, only subsequent to the movement of the control means to the first said position, to render the interlocking means active, means also responsive to the movement of the control means to still another position to render the said interlocking means inactive, the means responsive to the movement of the said control means to the second recited position to render the interlocking means active, being effective only when the said carriage reaches a predetermined position in its travel, the said interlocking means embodying a pivotally mounted locking element carried by one of said members, a co-operating part on the other member, with which said element co-operates, and a trip device adapted to be set in response to the operation of said control means, to set said trip device to trip said pivotally mounted locking element.

WALTER DORWIN TEAGUE, JR.
ROBERT H. ENSIGN.

REFERENCES CITED

The following references are of record in the file of this patent:

UNITED STATES PATENTS

| Number | Name | Date |
|---|---|---|
| 1,203,259 | Pogue | Oct. 31, 1916 |
| 1,801,649 | Thomas | Apr. 21, 1931 |
| 2,108,306 | Cooper | Feb. 15, 1938 |
| 2,136,480 | Trout | Nov. 15, 1938 |
| 2,225,252 | Auld et al. | Dec. 17, 1940 |
| 2,276,388 | Haag | Mar. 17, 1942 |